E. J. PLANCHE.
METHOD OF PREPARING BOTTOMS FOR THOMAS CONVERTERS.
APPLICATION FILED MAY 26, 1911.

1,010,312. Patented Nov. 28, 1911.

Witnesses:

Inventor
Ernest J. Planche

UNITED STATES PATENT OFFICE.

ERNEST JULES PLANCHE, OF PARIS, FRANCE, ASSIGNOR TO SOCIÉTÉ ANONYME DES FORGES ET FONDERIES DE MONTATAIRE, OF PARIS, FRANCE, A CORPORATION OF FRANCE.

METHOD OF PREPARING BOTTOMS FOR THOMAS CONVERTERS.

1,010,312.     Specification of Letters Patent.     Patented Nov. 28, 1911.

Application filed May 26, 1911. Serial No. 629,653.

*To all whom it may concern:*

Be it known that I, ERNEST JULES PLANCHE, citizen of the French Republic, residing at Paris, Department of the Seine, in France, have invented certain new and useful Improvements in Methods of Preparing Bottoms for Thomas Converters, of which the following is a specification.

The invention relates to a method of preparing the bottoms of Thomas converters for the manufacture of steel by the basic process. Hitherto these bottoms have been prepared with burned dolomite crushed and moistened with the quantity of tar which is strictly necessary (7 to 10%) for producing the agglomeration. This mixture was beaten down or rammed into a metal mold either mechanically or by hand by means of rammers; the necessary orifices for the passage of the air were provided either by means of pins subsequently withdrawn or by leaving in the mass twyers or perforated blocks of baked magnesia; these bottoms were stoved at a temperature of about 800° C. This method of manufacturing bottoms with pins and also bottoms with twyers presents inconveniences. The ramming and the compression cannot be absolutely uniform and frequently the different layers of a few centimeters that it is necessary to ram in succession do not combine perfectly. This lack of homogeneity is one of the causes of the more or less rapid wear and disintegration of the bottoms of converters rammed and formed in the manner described above. Furthermore, such mode of ramming or beating down is relatively costly.

The process contemplated by the present invention enables all ramming to be dispensed with and permits of obtaining converter bottoms which are less costly and more durable than rammed bottoms. With this object in view a mixture of dolomite and tar is employed in which the proportion of tar is appreciably larger (an increase of from 4 to 5%), the mixture preferably containing about 15 per cent. of tar or about half as large again as in the mixture for rammed bottoms; in this manner a sort of thick mortar is formed which is distributed between the pins and the twyers and which automatically equalizes itself.

Figure 1:
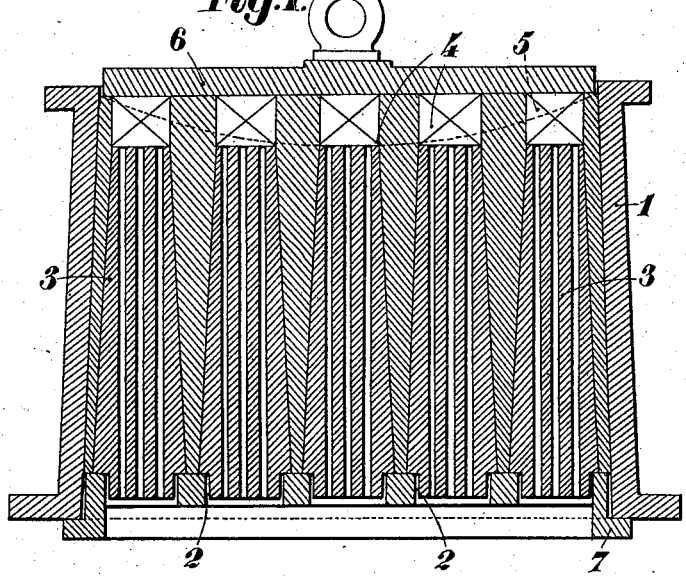
Figure 2:
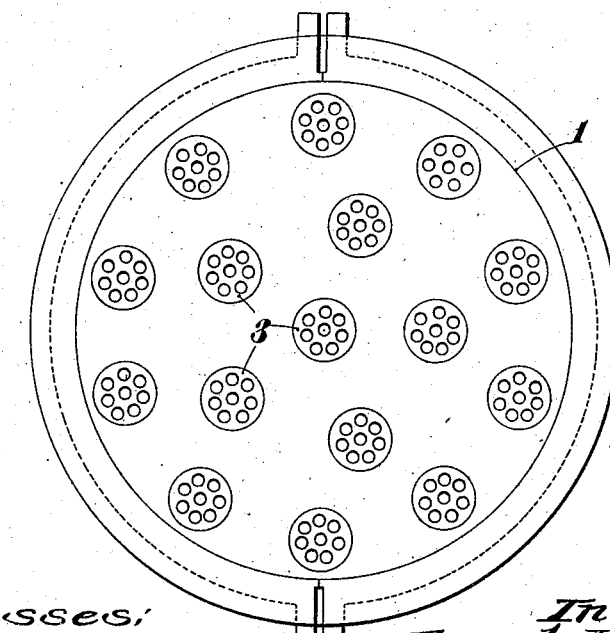

In the accompanying drawing illustrating the invention: Figure 1 is a vertical section of the mold employed for casting the mixture for a bottom with twyers; the arrangement is analogous for a bottom with pins. Fig. 2 is a plan view of the same apparatus.

The lower plate 7 of the mold 1 comprises housings 2 intended for retaining the twyers or perforated magnesia blocks 3. Iron fillers 4 are arranged upon these twyers for enabling the mixture to extend some distance upwardly beyond the top of the twyers in such a manner that the latter always remain embedded in the mixture notwithstanding the shrinkage caused by the burning and which imparts to the upper face of the converter bottom the form indicated by the dotted line 5; the cover 6 is next placed upon the mold and the whole is left for about two days in a stove the temperature of which is raised progressively from 300° to 400° C., care being had not to ignite the tar.

The bottoms of converters manufactured by this process are less costly than the others and they permit of making from 15 to 30% more castings per bottom than with rammed bottoms.

I claim:

1. The hereindescribed method of preparing bottoms for Thomas converters which consists in pouring and casting a mixture of crushed dolomite and tar between the pins of the twyers of such bottoms, and baking the bottoms at a temperature of between 300° and 400° C.

2. The hereindescribed method of preparing bottoms for Thomas steel converters which consists in pouring and casting a plastic mixture of crushed dolomite and tar in the proportion of about 15 per cent. tar, between the pins of the twyers of such bottoms, and baking the same at a temperature of between 300° and 400° C.

In testimony whereof I have hereunto set my hand in presence of two subscribing witnesses.

ERNEST JULES PLANCHE.

Witnesses:
  H. C. COXE,
  EMILE KLOTZ.

Copies of this patent may be obtained for five cents each, by addressing the "Commissioner of Patents Washington, D. C."